(12) United States Patent
Rusch et al.

(10) Patent No.: US 9,214,832 B2
(45) Date of Patent: Dec. 15, 2015

(54) PARALLEL ELECTRIC SERVICE SYSTEM AND METHOD USING METER SOCKET AND LOAD CENTER COMBINATION

(75) Inventors: Brian J. Rusch, Suwanee, GA (US); Arthur Kevin Shumate, Duluth, GA (US); Fan Zhang, Suwanee, GA (US); Carey D. Harnois, Grayson, GA (US); Raymond Strods, Cape Coral, FL (US); James Washburn, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 689 days.

(21) Appl. No.: 13/167,355

(22) Filed: Jun. 23, 2011

(65) Prior Publication Data

US 2012/0326518 A1   Dec. 27, 2012

(51) Int. Cl.
*H02J 1/00* (2006.01)
*H02J 3/00* (2006.01)
*H02J 7/34* (2006.01)
*H02J 9/06* (2006.01)
*H02J 7/35* (2006.01)

(52) U.S. Cl.
CPC . *H02J 7/34* (2013.01); *H02J 9/062* (2013.01); *H02J 7/355* (2013.01); *H02J 2001/004* (2013.01); *Y02B 10/30* (2013.01); *Y02B 10/72* (2013.01); *Y02B 90/14* (2013.01); *Y02E 10/766* (2013.01); *Y10T 307/696* (2015.04)

(58) Field of Classification Search
CPC .................................. H02J 7/34; H02J 9/062
USPC .................. 307/43, 64, 66, 80; 361/632, 634
See application file for complete search history.

(56) References Cited

U.S. PATENT DOCUMENTS

| | | | | |
|---|---|---|---|---|
| 5,870,276 A | * | 2/1999 | Leach | H02B 1/03 361/627 |
| 6,009,406 A | * | 12/1999 | Nick | 705/7.24 |
| 6,503,098 B2 | * | 1/2003 | Aoki et al. | 439/502 |
| 2002/0171436 A1 | * | 11/2002 | Russell | G01R 11/04 324/602 |
| 2008/0278003 A1 | * | 11/2008 | Pouchet et al. | 307/66 |
| 2009/0027932 A1 | * | 1/2009 | Haines | H02J 9/062 363/95 |
| 2009/0207559 A1 | * | 8/2009 | Zhang | 361/679.01 |
| 2009/0234757 A1 | * | 9/2009 | Tarbell et al. | 705/30 |
| 2010/0114392 A1 | * | 5/2010 | Lancaster | 700/292 |
| 2011/0057514 A1 | * | 3/2011 | Lathrop | G01D 4/002 307/64 |

* cited by examiner

*Primary Examiner* — Rexford Barnie
*Assistant Examiner* — Rasem Mourad

(57) ABSTRACT

A parallel electric service system including a combination load center is disclosed. More particularly, the parallel electric service system encompasses a combination load center adapted to receive power from a utility power source and a parallel power source such as a solar module, wind turbine, fuel cell, or the like. Power may be supplied to electrical loads of branches of the system by the utility power source, parallel power source, or both. The system also provides electrical usage metering and allows electrical power to flow back to the grid. Methods of connecting parallel power sources in the parallel electric service system are provided, as are other aspects.

12 Claims, 5 Drawing Sheets

PARALLEL ELECTRIC SERVICE SYSTEM AND METHOD USING METER SOCKET AND LOAD CENTER COMBINATION

FIELD OF THE INVENTION

The present invention relates generally to systems and methods including parallel power sources.

BACKGROUND INFORMATION

Secondary sources of power are becoming more common. For example, home wind turbines and solar energy systems are being used to provide a second source of electrical power. In particular, there are many situations where it may be desirable to have another power source to supplement the utility power or that can be switched to and from an electrical load, such as, for example, in the event of a public utility power failure or due to excessive power variations.

Such secondary power sources, however, may be installed after a home has already been constructed. Accordingly systems are needed to seamlessly integrate such secondary power sources into the power supply environment. Further, with the advent of personal wind, solar, and other electricity generating systems, electricity may rightfully be sold back to the grid. Therefore, there is a need for improvements to systems including load centers adapted to interface with secondary power sources.

SUMMARY

According to a first aspect, an improved parallel electrical service system is provided. The parallel electrical service system includes a parallel power source; a utility power source; an inverter electrically coupled to the parallel power source; an enclosure having a utility compartment and a load center compartment; a load panel mounted in the load center compartment having one or more main service disconnect breakers; a utility meter provided in the utility compartment, the meter having meter inputs electrically coupled to the utility power source and meter outputs electrically connected to the one or more main service disconnect breakers of the load panel; and one or more parallel source disconnect breakers mounted in the load center compartment, the one or more parallel source disconnect breakers electrically connected to the inverter and the meter outputs.

According to another aspect, an improved parallel electrical service system is provided. The parallel electrical service system includes an enclosure having a utility compartment and a load center compartment; a meter socket in the utility compartment adapted to receive a utility meter, the meter socket including line poles and load poles, the line poles adapted to be electrically connected to a utility power source; a load panel mounted in the load center compartment, the load panel having a base pan, and one or more main service disconnect breakers provided on the base pan; load conductors electrically connecting the load poles with the one or more main service disconnect breakers; a parallel source disconnect breaker mount provided in the load center compartment and adapted to receive a parallel power source disconnect breaker; parallel power conductors electrically connecting the load poles of the meter socket and the parallel source disconnect breaker mount; and a parallel power system electrically connected to the parallel source disconnect breaker mount.

According to yet another aspect, an improved method of connecting parallel power sources is provided. The method of connecting parallel power sources includes providing a parallel power system; providing a utility power source; providing an enclosure having a utility compartment with a utility meter mounted therein, the utility meter having meter inputs and meter outputs, and a load center compartment having a load panel and one or more parallel source disconnect breakers mounted therein, the load panel including a main service disconnect breaker; electrically coupling the meter inputs of the utility meter to the utility power source; electrically coupling the meter outputs to the main service disconnect breaker and the parallel source disconnect breaker; electrically coupling the parallel source disconnect breaker to the parallel power system; and feeding electrical power generated by the parallel power system to the load panel, to the utility power source through the utility meter, or both.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The drawings are not necessarily drawn to scale. The invention covers all modifications, equivalents, and alternatives falling within the spirit and scope of the invention.

DETAILED DESCRIPTION

Reference will now be made in detail to the exemplary embodiments of this disclosure, examples of which are illustrated in the accompanying drawings. Wherever possible, the same reference numbers will be used throughout the drawings to refer to the same or like parts.

The aforementioned problems of electrical service systems including secondary power sources are overcome by the present invention. In particular, the inventive parallel electric service system integrates utility metering and utility power and parallel power integration in a compact arrangement. Accordingly, the invention provides a compact electric service system enabling electrical connections to a utility power source and a parallel power system, and further allows connection to one or more electrical circuit branches with electrical loads coupled thereto. The parallel electric service system allows for the integration of one or more parallel power sources, such as a solar module, a wind generator, fuel cell, or the like. The invention advantageously integrates the one or more parallel power sources into utility power grid, allows for the one or more parallel power sources to supply a load panel of the electrical power system along with utility power, and also allows for generated electrical power to flow back to the utility power grid, hence reducing overall utility power consumption. The invention will be explained in greater detail with reference to FIGS. 1-5 below.

Figure 1:
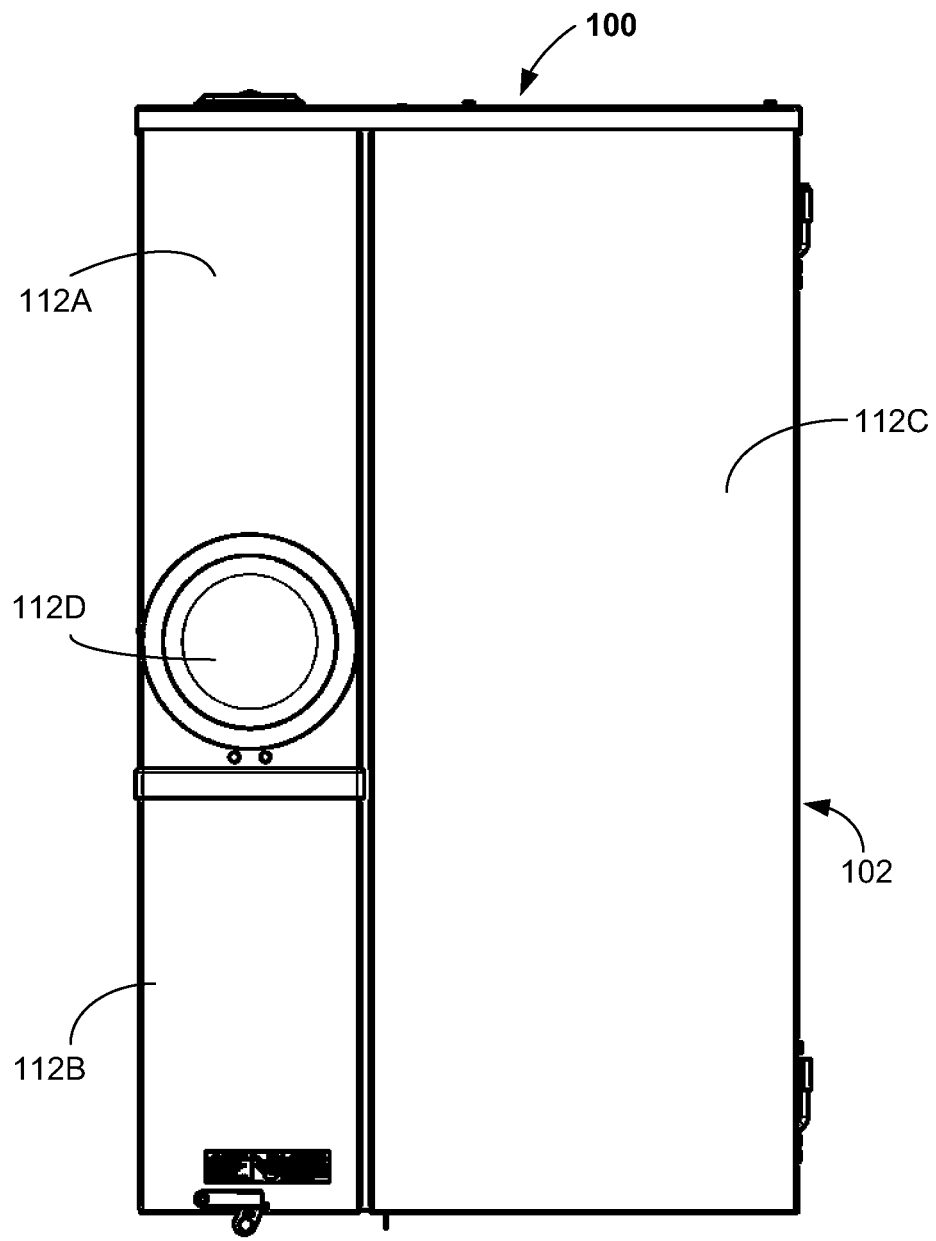
FIG. 1 illustrates a front plan view of a combination load center used in embodiments of the invention.
Figure 2:
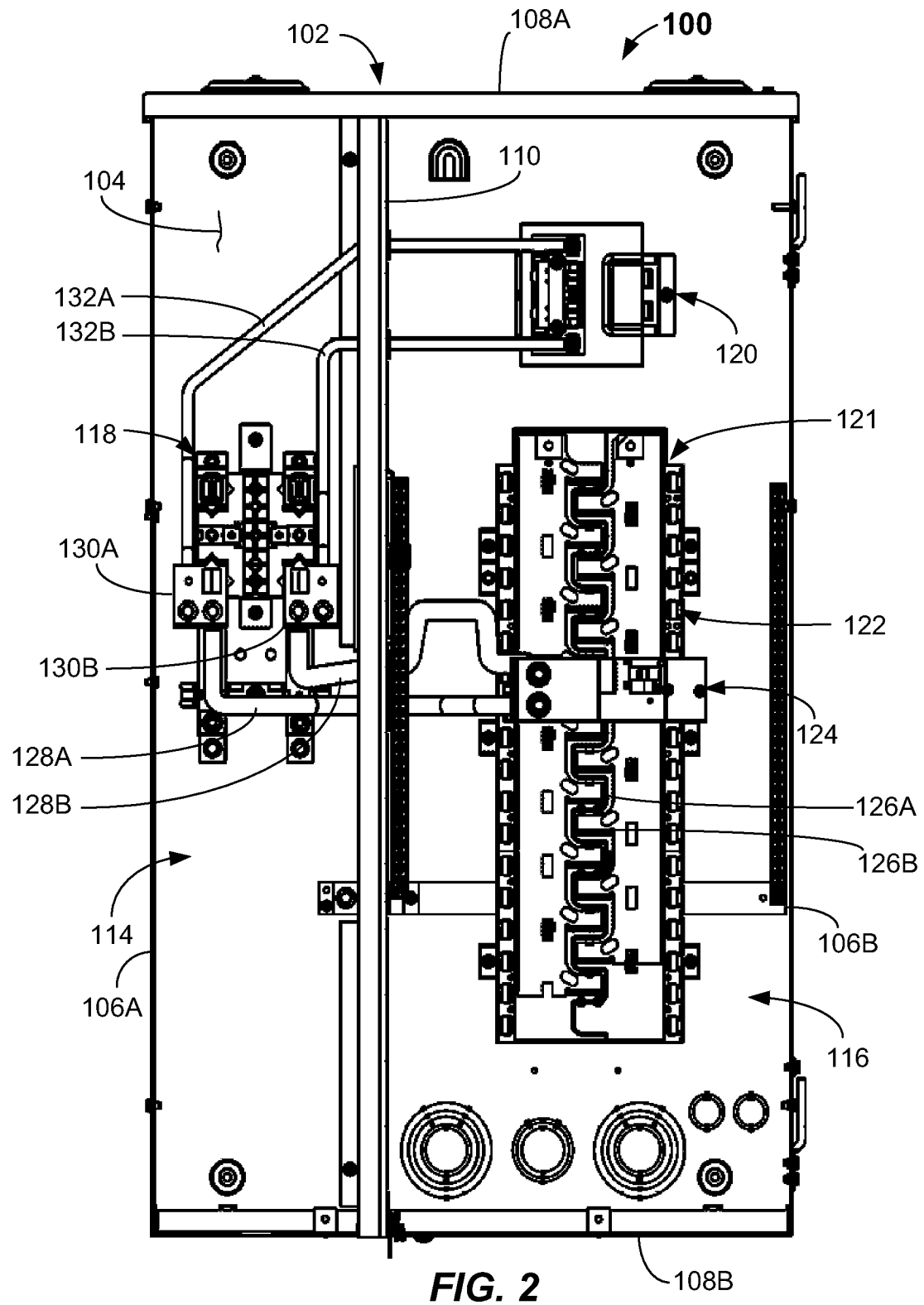
FIG. 2 illustrates a detailed inside view of a combination load center used in embodiments of the invention.
Figure 3:
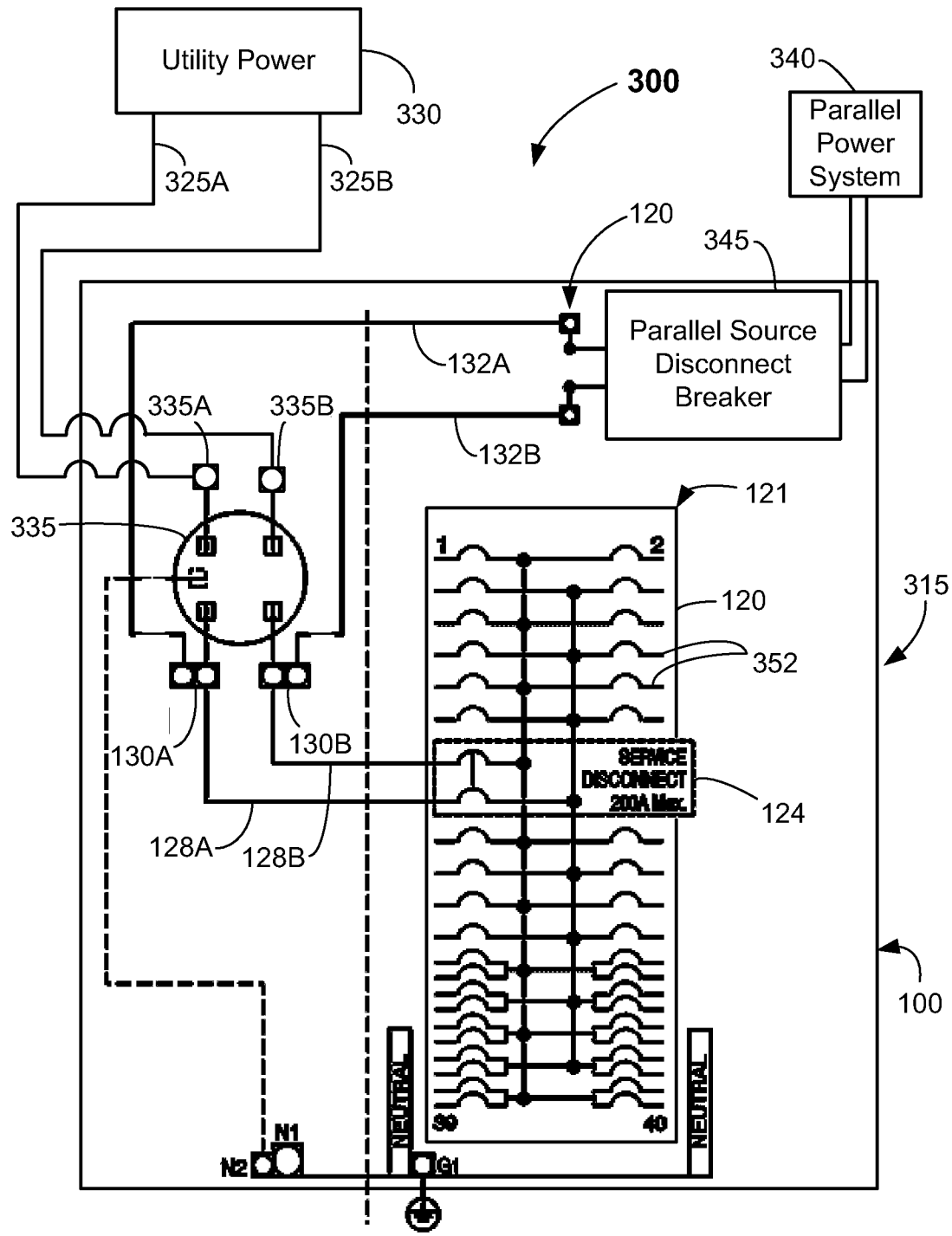
FIG. 3 is an electrical diagram of a parallel electric power system according to embodiments of the invention.
Figure 4:
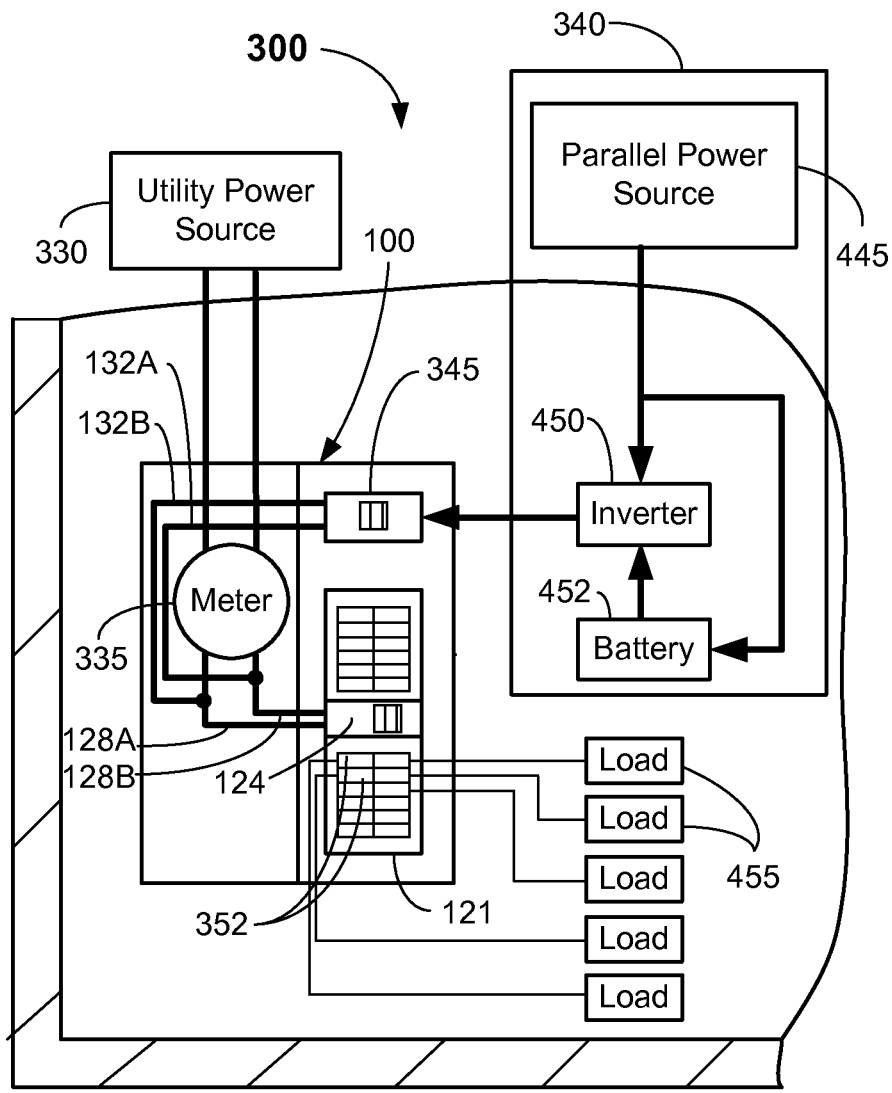
FIG. 4 is an electrical block diagram of a parallel electric power system according to embodiments of the invention.

FIGS. 1-2 illustrate an embodiment of a combination load center apparatus 100 that may be used in the inventive parallel electric service system 300 (shown in FIGS. 3 and 4). The combination load center apparatus 100 may include an enclosure 102 (e.g., a metal box) that may include a back wall 104, side walls 106A, 106B, top and bottom walls 108A, 108B, and a barrier wall 110. Covers 112A, 112B, and 112C may be provided on the front of the enclosure 102. One of the covers (e.g., 112A) may include a meter window 112D adapted to allow a utility meter (not shown) to be viewed with the cover in a closed orientation. The enclosure walls 102, 104, 106A, 106B, 108A, and 108B, and barrier wall 110 may form a utility compartment 114 and a load center compartment 116. The utility compartment 114 and the load center compartment 116 may be divided by the barrier wall 110 and are adapted to receive utility components and load and parallel power system connection components as will be described further herein.

In the utility compartment 114, a meter socket 118 may be mounted to the back wall 104, such as by fasteners (e.g., screws). The meter socket 118 includes electrical contacts adapted to contact meter inputs and meter outputs and is adapted to receive and mount a conventional utility meter. Any suitable meter may be used. The load center compartment 116 may include a parallel power disconnect breaker mount 120 on the back wall 104, such as at a top side thereof. The parallel power disconnect breaker mount 120 is adapted to receive a rated circuit breaker. The load center compartment 116 may also include a load panel 121 having a base pan 122 with a plurality of stabs (e.g., locations) adapted to receive a plurality of circuit breakers (not shown) to which a plurality of electrical branches including electrical loads may be connected (See FIG. 4). The base pan 122 may be manufactured from an insulator material (e.g., plastic) and be mounted to the back wall 104 of the enclosure 102 by fasteners (e.g., screws).

One or more main service disconnect breakers 124 may be provided on the base pan 122, such as A phase and B phase circuit breakers shown. The one or more main service disconnect breakers 124 plug onto the base pan 122 and electrically connect to the bus bars 126A, 126B of the base panel 122 and to first and second load conductors 128A, 128B. One load conductor (e.g., 128A) may connect to an A phase circuit breaker and the other (e.g., 128B) may connect to the B phase circuit breaker. Bus bars 126A, 126B are of conventional construction. The first and second load conductors 128A, 128B attach between the one or more main service disconnect breakers 124 and meter socket connection terminals 130A, 130B of the meter socket 118 by suitable fasteners (e.g., lug screws). Additionally, first and second parallel power conductors 132A, 132B attach and electrically connect between the parallel power disconnect breaker mount 120 and meter socket connection terminals 130A, 130B of the meter socket 118. As will be apparent from the following, a parallel source disconnect breaker 345 (FIG. 3), such as a circuit breaker, may be mounted to the parallel power disconnect breaker mount 120 and may be used to electrically connect or disconnect a parallel power system 340 from the electric service system 300.

In a typical installation of the parallel electrical service system 300, as shown in FIGS. 3 and 4, the load center apparatus 100 is installed in an area 315 where power leads 325A, 325B from utility power source 330 (e.g., main utility line) can be readily electrically connected to the load center apparatus 100. The power leads 325A, 325B from utility power source 330 are connected to first poles 335A, 335B (e.g., electrical lugs) on the line side of a utility meter 335 installed in the combination load center apparatus 100. The meter inputs are adapted to electrically couple to the first poles 335A, 335B. Meter outputs are adapted to couple to second poles 130A, 130B. The terms "meter inputs" and "meter outputs" are not meant to refer to any current flow direction. As will be apparent, the electrical current generated from parallel power source 445 will flow to the parallel electric service system 300, sometimes the energy generated from parallel power source 445 is less than the demand of consumption of the parallel electric service system 300, the parallel power system 300 will draw power from utility power source 330 to meet demand. At other times the parallel power source 445 oversupplies beyond the instant need of parallel electric service system 300 for electrical power, the oversupplied energy will flow from parallel electric service system 300 to utility power source 330. The area 315 is typically a utility room, a garage, a basement, a hallway, a closet, or an outside wall, to name a few.

As shown in FIGS. 3 and 4, the parallel electric service system 300 includes a parallel power system 340 that may be coupled to a parallel source disconnect breaker 345 mounted to the parallel source disconnect mount 120 that is provided in the combination load center 100. The parallel source disconnect breaker 345 is electrically connected to the meter socket load connection terminals 130A, 130B of a utility meter 335 on the load side of the meter 335 by parallel power conductors 132A, 132B. The parallel power system 340 may be any electrical power generating system including a parallel power source 445 (FIG. 4). The parallel power source 445 may be selected from the group of a solar module (e.g., solar panel), a wind turbine, or a fuel cell, for example. Other types of parallel power sources may be used as well.

In the depicted example, the parallel power source 445 may generate up to 60 A or 200 A of electrical power at utility grid voltage depending on the rating of the combination load center 100. For example, if the utility grid voltage is 120/240 vac, the parallel power source 445 can generate up to 14.4 kw or 48 kw of electrical power. For example, solar modules (e.g., solar panels) may generate about 20 w per square foot. One system 300 may include one or up to about 70 square feet or more solar modules. In the case of a wind turbine, such as a small personal wind turbine for home use, the system 300 may include one or more such wind turbines. For example, the wind turbines may each be able to generate between 150 w and 1000 w. In the case of a fuel cell for home use that converts natural gas into electrical power (e.g., natural gas fuel cells) the parallel electric service system 300 may include one or more such fuel cells. For example, the fuel cells may each be able to generate between 1 Kw and 5 Kw.

The parallel source disconnect breaker 345 may be a circuit breaker rated up to the rating of the main service disconnect breaker, 124, for example. The parallel source disconnect breaker 345 may be rated at 15 A, 20 A, 30 A, 40 A, or 60 A, or 100 A, 125 A, 150 A or 200 A, for example. Other values may be used.

The utility power source 330 may be a conventional public utility service provided at about 240V, for example. In some embodiments, the power service may be about 200 A. The utility power source 330 electrically couples through the utility meter 335 to a main service disconnect breaker 350 that functions to connect/disconnect power to the load panel 121 in the load center compartment 116. The load panel 121 may include, for example, a plurality of spaces/positions for a plurality of branch circuit breakers 352. For example, in the depicted embodiments of FIG. 3, 40 spaces or positions for 40 circuit breakers (e.g., 15 A-30 A) breakers that may service and protect 40 electrical branch circuits including electrical loads 455 is shown. Other sizes and numbers may be used, such as 6 space, 8 space, 10 space, 12 space, 16 space, 20 space, 30 space, etc. Not all spaces/positions need to include circuit breakers. Moreover, provisions for branch circuits are optional in this enclosure, and may thus be omitted. In this case, provisions to wire to a downstream load center or junction box may be provided.

FIG. 4 illustrates a detailed block view of the parallel electric service system 300. The utility power source 330 may provide power to the one or more electrical branches including electrical loads 455 when the parallel power system 340 is disconnected, such as by switching the parallel source disconnect breaker 345 to an OFF position. In this configuration the system 300 operates as a conventional power service system directing electrical power directly from the utility power source 330 through the utility meter 335 and to the one or more electrical branches including electrical loads 445 electrically connected to the load panel 121. When the parallel power system 445 is connected, such as by switching the parallel source disconnect breaker 345 to an ON position, power may be fed from the parallel power system 340 to the one or more electrical loads 445 through parallel power conductors 132A, 132B, load conductors 128A, 128B, main service disconnect breaker 124 and load panel 121. Power may be provided directly from the parallel power source 445 if sufficient power is being generated by the parallel power source 445. Optionally, power may be provided from one or more batteries 452 if insufficient power is being generated by the parallel power source 445. The one or more batteries 452 may be a bank of 12 V batteries, for example. In some embodiments power from both of the battery 452 and the parallel power source 445 may be provided to the electrical loads 445 connected to the load panel 121. The inverter 450 functions to synchronize the power from parallel power source 445 or from the battery 452 to match the power property from utility power source 330, such as 120/240 vac, 60 Hz utility power or 120 v/208 Y vac, 60 Hz utility power.

When the parallel power source 445 is generating sufficient electricity, then the inverter 450 may permit the generated power to transfer directly to the loads 445 from the load panel 121. In other instances, such as when the parallel source disconnect breaker 345 is in an OFF position, the inverter 450 will allow the one or more batteries 452 to be charged. In instances where more power is being generated than is being used by the one or more electrical loads 455, electrical power generated by the parallel power source 445 may be supplied to the utility power source 330 and sold back to the grid. In this event, the utility meter 335 will reverse its operation. For example, if the one or more batteries 452 have a sufficient charge, then all power beyond which is required by the loads 455 may be fed back to the grid.

In cases where the utility power source 330 is down, the inverter 450 senses this condition, will interrupt the output to the parallel source disconnect breaker 345, and does not allow power generated by the parallel power source 445 to be sent onto the grid. Instead, the one or more batteries 452 may be charged. As should be apparent, the present parallel electric service system 300 includes a combination load center 100 to allow connection of one or more parallel power sources 445. In one aspect, the present parallel electric service system 300, the sum of the amperage ratings for the parallel power conductors 132A, 132B and the load conductors 128A, 128B may exceed the utility service amperage rating. Likewise, it should be apparent that the sum of the ratings for the main service disconnect breaker 124 and the parallel source disconnect breaker 345 may exceed the utility service amperage rating.

Figure 5:
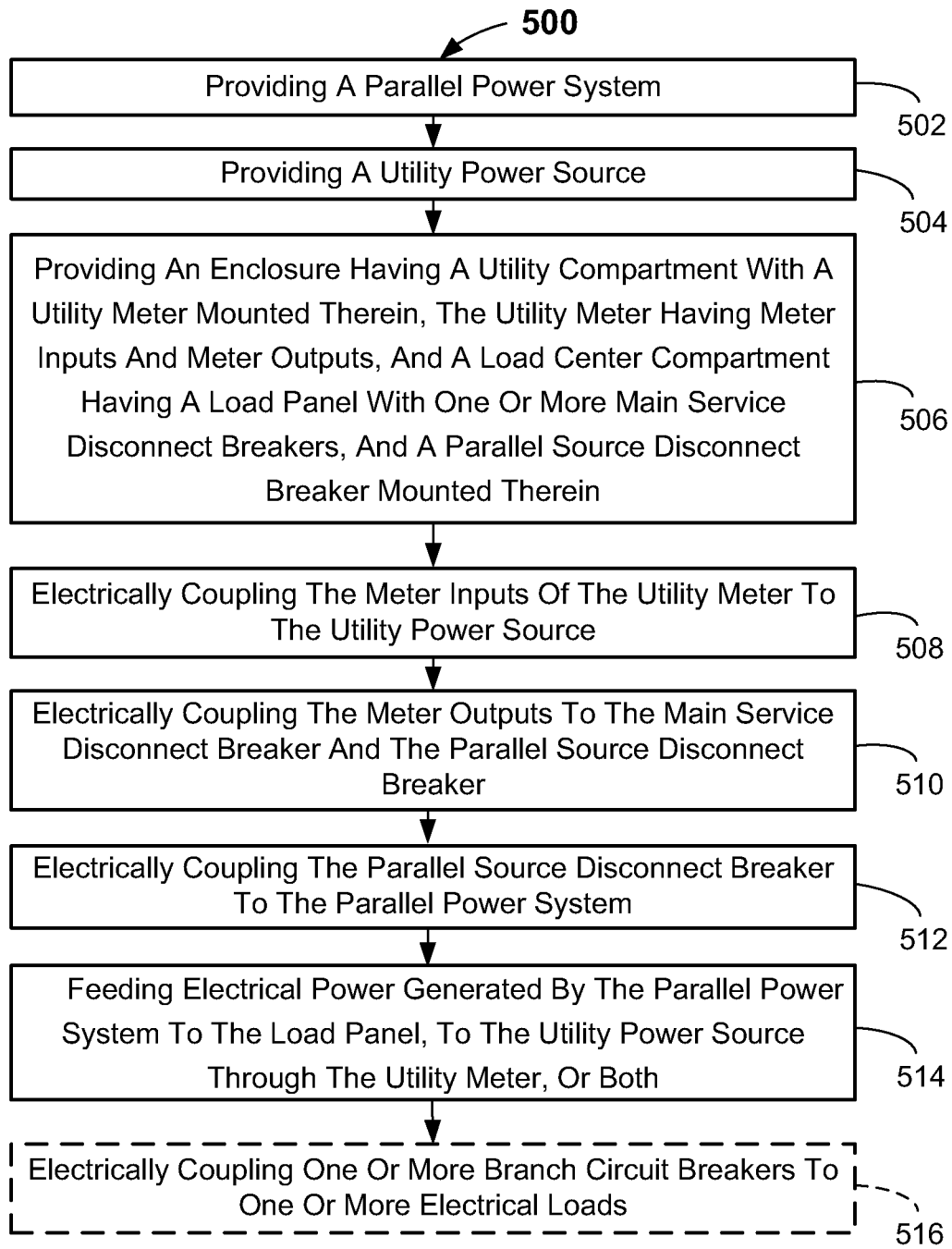
FIG. 5 is a flowchart of a method of operation of a parallel electric service system according to embodiments of the invention.

A method of connecting one or more parallel power sources, such as a parallel power system 340 and a utility power source 330, will now be described with reference to FIG. 5. The method 500 includes providing a parallel power system (e.g., parallel power system 340) in block 502; providing a utility power source (e.g., utility power source 330) in block 504; and providing an enclosure (e.g., enclosure 102) in block 506. The enclosure may have a utility compartment (e.g., utility compartment 114) with a utility meter (e.g., utility meter 335) mounted therein, the utility meter having meter inputs and meter outputs, a load center compartment (e.g., load center compartment 116) having a load panel (e.g., load panel 121) having one or more main service disconnect breakers (e.g., main service disconnect breaker 124), and one or more parallel source disconnect breakers (e.g., parallel source disconnect breaker 345) mounted therein. Optionally, one or more branch circuit breakers (e.g., branch circuit breakers 352) may be provided. These may be provided in the load panel (e.g., load panel 121) or in a connected secondary service box, such as a junction box. Providing the parallel power system in block 502, and providing a utility power source in block 504 may include having a utility service connection available at the location, and having the parallel power system at the location. The method 500 further includes electrically coupling the meter inputs of the utility meter to the utility power source in block 508, electrically coupling the meter outputs to the main service disconnect breaker and the parallel source disconnect breaker in 510, and electrically coupling the parallel source disconnect breaker to the parallel power system in 512. Finally, in block 514, the system feeds back electrical power generated by the parallel power system to the load panel (e.g., load panel 121) to power the one or more electrical loads, to the utility power source (e.g., utility power source 330) through the utility meter (e.g., utility meter 335), or both. Additionally, the method 500 may include electrically coupling one or more branch circuit breakers to one or more electrical loads in 516.

Thus, the method 500 may operate to receive and distribute power to and from the utility power source 330, receive and distribute power generated by the parallel power system 340, or distribute power from both. Further, if an abundance of power is generated beyond the power requirements of the attached electrical loads 455, then power may be supplied back to the utility power source 330 (e.g., the electrical grid).

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the spirit and scope of the invention.

What is claimed is:

1. A parallel electric service system, comprising:
a parallel power source;
a utility power source from a utility;
an inverter electrically coupled to the parallel power source;
an enclosure having a utility compartment and a load center compartment;

a load panel mounted in the load center compartment having one or more main service disconnect breakers;

a utility meter provided in the utility compartment, the utility meter having meter inputs electrically coupled to the utility power source and meter outputs electrically connected to the one or more main service disconnect breakers of the load panel by first and second load conductors, wherein the first and second load conductors attaching to meter socket connection terminals of the meter outputs and the one or more main service disconnect breakers; and a parallel source disconnect breaker mounted in the load center compartment, the parallel source disconnect breaker electrically connected to the inverter and the meter outputs, the connection between the parallel source disconnect breaker and the meter outputs made by first and second parallel power conductors, wherein the first and second parallel power conductors attaching to meter socket connection terminals of the meter outputs, wherein the first and second load conductors attaching to the meter socket connection terminals are separate conductors from the first and second parallel power conductors attaching to the meter socket connection terminals, wherein the parallel power source concurrently provides power to both the load panel and the utility back through the utility meter.

2. The parallel electric service system of claim 1, wherein the parallel power source is one or more selected from the group of a solar module, a wind turbine, and a fuel cell.

3. The parallel electric service system of claim 1 wherein a meter socket includes a joint connector receiving a parallel power conductor electrically connected to the parallel source disconnect breaker and a load conductor electrically connected to the load panel.

4. The parallel electric service system of claim 1 wherein a meter socket receiving the meter includes four poles on a load side, two poles being connected to parallel power conductors electrically connected to the parallel source disconnect breaker, and two poles being connected to load conductors electrically connected to the load panel.

5. The parallel electric service system of claim 4 wherein an amperage rating of the one or more parallel power source disconnect breakers and an amperage rating of the main service disconnect breaker is greater than the amperage rating of the meter socket.

6. The parallel electric service system of claim 1 wherein a sum of electrical ratings for the parallel power conductors and the electrical rating of the load conductors exceeds a meter socket rating.

7. The parallel electric service system of claim 1 wherein a sum of amperage ratings for the main service disconnect breakers and the one or more parallel source disconnect breaker(s) exceeds a utility service amperage rating.

8. A parallel electrical service system, comprising:
an enclosure having a utility compartment and a load center compartment;
a meter socket in the utility compartment adapted to receive a utility meter, the meter socket including line poles and load poles, the line poles adapted to be electrically connected to a utility power source from a utility;
a load panel mounted in the load center compartment, the load panel having
a base pan, and
one or more main service disconnect breakers provided on the base pan;

first and second load conductors electrically connecting the load poles of the meter socket with the one or more main service disconnect breakers, wherein the first and second load conductors attach to meter socket connection terminals of the load poles;

a parallel source disconnect breaker mount provided in the load center compartment and adapted to receive a parallel power source disconnect breaker;

first and second parallel power conductors electrically connecting the load poles of the meter socket and the parallel source disconnect breaker mount, wherein the first and second parallel power conductors attach to the meter socket connection terminals of the load poles, wherein the first and second load conductors attached to the meter socket connection terminals are separate conductors from the first and second parallel power conductors attached to the meter socket connection terminals; and a parallel power system electrically connected to the parallel source disconnect breaker mount, wherein the parallel power system concurrently provides power to both the load panel and the utility back through the utility meter.

9. A method of connecting parallel power sources, comprising:
providing a parallel power system;
providing a utility power source;
providing an enclosure having
a utility compartment with a utility meter mounted therein, the utility meter having meter inputs and meter outputs, and
a load center compartment having a load panel and one or more parallel source disconnect breakers mounted therein, the load panel including a main service disconnect breaker;
electrically coupling the meter inputs of the utility meter to the utility power source;
electrically coupling the meter outputs to the main service disconnect breaker by attaching first and second load conductors to meter socket connection terminals and electrically coupling the meter outputs to the parallel source disconnect breaker by attaching first and second parallel power conductors to the meter socket connection, wherein the first and second load conductors attached to the meter socket connection terminals are separate conductors from the first and second parallel power conductors attached to the meter socket connection terminals;
electrically coupling the parallel source disconnect breaker to the parallel power system; and
feeding electrical power generated by the parallel power system concurrently to both the load panel and the utility power source through the utility meter.

10. The method of claim 9, wherein the parallel power system includes a parallel power source selected from one or more the group of a solar module, a wind turbine, and a fuel cell.

11. The method of claim 9, comprising providing a sum of electrical ratings for the parallel power conductors and electrical rating of the load conductors that exceeds a meter socket amperage rating.

12. The method of claim 9, comprising providing a sum of amperage ratings for the main service disconnect breaker and the parallel source disconnect breaker that exceeds a meter socket amperage rating.

* * * * *